United States Patent Office 3,461,136
Patented Aug. 12, 1969

3,461,136
DIIMIDE-DIESTERS OF TRICARBOXYLIC ANHYDRIDES
Gerfried Pruckmayr, Wilmington, Del., and Claus Victorius, Media, Pa., assignors to E. I. du Pont de Nemours and Company, Wilmington, Del., a corporation of Delaware
No Drawing. Filed Oct. 31, 1966, Ser. No. 590,469
Int. Cl. C07d 27/70
U.S. Cl. 260—326
3 Claims

ABSTRACT OF THE DISCLOSURE

A diimide-diester of the formula

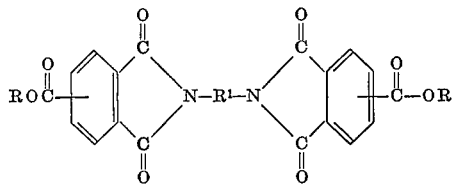

wherein R is aryl and $R^1$ is a divalent radical containing 2–20 carbon atoms which is a useful intermediate that can be further reacted to form, for example, a polyamide-imide polymer.

---

This invention relates to an imide-ester and particularly to a diimide-diester formed by the condensation reaction of an aryl ester of a tricarboxylic anhydride with an aromatic or aliphatic diamine.

The novel diimide-diester of this invention is stable at high temperatures, e.g., 300° C. and above, has a relatively high melting point and is particularly useful as an intermediate for forming polymers, e.g., polyamide-imide polymers and polyimide-ester polymers. Also, the diimide-diester of this invention when used to form polymers has advantages over prior art processes for forming polymers. For example, Lavin et al., U.S. Patent 3,260,691, issued July 12, 1966, discloses a process for making polyamide-imide polymers by the reaction of trimellitic anhydride mono-acid chloride with methylene dianiline. However, in this process, the halide reaction byproduct, triethyl-amine hydrogen chloride, has to be removed to obtain a useable polymer.

The diimide-diester of this invention can be used to obtain polyamide-imide polymer by reacting this novel compound with a diamine. Using the novel diimide-diester of this invention, no undesirable corrosive by-products are formed as in the aforementioned prior art process and a polymer is formed that has good flexibility, toughness and is useful as an impregnant and as a coating composition.

The novel diimide-diester of this invention has the following formula

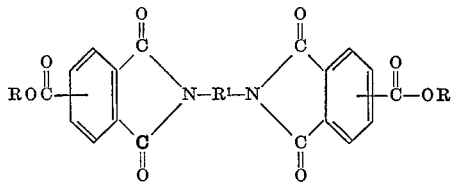

wherein R is aryl, preferably phenyl, and $R^1$ is a divalent radical containing 2–20 carbon atoms, preferably phenylene or methylene diphenyl.

This novel diimide-diester is prepared by reacting an aryl ester of a tricarboxylic anhydride and a diamine in a molar ratio of about 2:1 at about 100–300° C. and preferably at about 150–250° C. The reaction can be carried out as a melt, i.e., the aforementioned reactants are mixed in a vessel and heated until they become molten and then reacted, or the reactants can be dissolved in a solvent, such as N-methylpyrrolidone, and reacted in a solution.

The general formula of useful aryl esters is

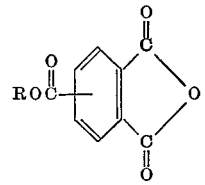

wherein R is a monovalent aromatic radical, preferably phenyl. These useful aryl esters are formed from a tricarboxylic anhydride that contains at least one pair of carboxyl groups with respect to each other or situated in such a fashion which permits the formation of an anhydride structure with the other carboxyl group and has a third carboxyl group that is reacted with a compound such as phenol, cresol, xylenol, p-phenylphenol, α or β naphthol and the like.

One preferred aryl ester is 4-phenyl trimellitate anhydride which is readily available and forms an excellent polyamide-imide polymer which has excellent adhesion and good high temperature properties and good electrical properties. Another useful aryl ester is 4-phenyl hemimellitic anhydride.

A variety of organic diamines characterized by the formula $H_2N—R^1—NH_2$ can be used in the process of this invention, where $R^1$ is a divalent radical which has 2–20 carbon atoms and has each amine group attached to separate carbon atoms of the divalent radical. $R^1$ can be aromatic, aliphatic, cycloaliphatic, a combination of aromatic and aliphatic, heterocyclic, bridged organic radicals when the bridge is oxygen, nitrogen, sulfur, silicon and phosphorus, and substituted groups therefor. Useful diamines are disclosed in Edwards U.S. Patent 3,179,614, issued Apr. 20, 1965, column 4, lines 50–75, column 5, lines 1–8. This disclosure is hereby incorporated by reference, for the purpose of illustrating various diamines which are useful herein. Among the preferred diamines used in this invention which give diimide-diesters that are formable into high molecular weight polymers that have excellent adhesion and durability and high temperature resistance are m-phenylene diamine, p-phenylene diamine, methylene dianiline, and oxydianiline.

As aforementioned, the diimide-diester of this invention can be formed in a melt reaction or in solution reaction, i.e., dissolving the reactants in a high boiling solvent and heating the solution to a high temperature to form the diimide-diester. In a solution reaction, the following high boiling liquids are useful: N-methyl pyrrolidone, dimethyl acetamide, dimethyl formamide, dimethyl sulfoxide, and the like. These solvents dissolve the reactants and permit the reaction to take place at temperatures above 100° C., and preferably, at about 150–250° C.

The novel diimide-diester of this invention is a heat resistant solid having a high melting point and can be used as a high temperature heat transfer medium. The diimide-diester of this invention is particularly useful as a polymer intermediate since it can readily be reacted with any of the aforementioned diamines to form a stable heat resistant polyamide-imide polymer which is useful as an impregnant or as a high temperature coating for metals, as a wire enamel or can be cast into a free film. This diimide-diester can also be reacted with a glycol to form a polyimide-ester polymer. Typically useful glycols are, for example, hexamethylene glycol, 1,4-cyclohexane-dimethanol, decamethylene glycol, polyoxyethylene glycol and the like. These polyimide-ester polymers are also useful as impregnants or as coatings for metals or as a wire enamel.

The following examples illustrate the invention.

EXAMPLE 1

A 250 milliliter resin kettle is charged with 40.23 grams (0.15 mole) 4-phenyl trimellitate anhydride, 14.87 grams (0.075 mole) 4,4'-methylenedianiline and 157.2 grams N-methylpyrrolidone. The resin kettle is equipped with an anchor stirrer, a thermometer, a nitrogen inlet and a variable take-off reflux condenser and a receiver. The reaction mixture is stirred under nitrogen without heating until a homogeneous solution is obtained. The reaction mixture is then heated to reflux with a heating mantle and a heating type. The nitrogen is turned off and distillate is collected, first at total take-off and then at partial take-off, for 20 minutes to raise the distillation head temperature to 203.5°. The reaction mixture is held at total reflux for an additional 15 minutes and the reaction mixture is then cooled under nitrogen. As the hot, clear, amber reaction mixture is cooled, it turns to an orange suspension at about 180° C. and a solid precipitates from the solution at room temperature.

The reaction product is stirred into a large excess of deionized water in a laboratory disintegrator, filtered onto a Buchner funnel, washed with deionized water, and dried to constant weight in a 100° C. vacuum oven. About 49.7 grams (95% yield) of an off-white, powdery solid melting at 182–184° C. is obtained. Analysis of the product (diimide-diester) shows carbon 73.68%; hydrogen 3.86%; nitrogen 4.26%; and oxygen 18.20%. The product is calculated to be $C_{43}H_{26}O_8$ having carbon 73.92%; hydrogen 3.75%; nitrogen 4.01% and oxygen 18.32%.

A polyamide-imide polymer is obtained by charging a 250 milliter resin kettle with 34.93 grams (0.05 mole) of the above prepared diimide-diester, 9.91 grams (0.05 mole) 4,4'-methylenedianiline and 35.43 grams N-methylpyrrolidone (dried over molecular sieves). The resin kettle is heated to reflux under nitrogen. The nitrogen is turned off and the solution is heated at total reflux for six hours. During this period, the kettle temperature drops from 227° to 221° and the head temperature from 210° to 208° and the reaction mixture becomes extremely viscous. After cooling to room temperature under nitrogen, the prepolymer solution is diluted to 25% theoretical polyamide-imide solids with N-methylpyrrolidone. The solution is then homogenized by heating.

The resulting product is an amber, slightly cloudy solution having a viscosity of 11 poises and a solids content of about 22%. The inherent viscosity of the polymer, determined on a sample precipitated into chloroform and air-dried, is 0.39 (0.5 solution in dimethylacetamide at 25° C.). A film cast from the polymer solution on a copper panel with a 10 mil blade and baked 1 hour at 150° C. +2 minutes at 400° C. is light amber, clear and smooth. The film has excellent adhesion to the metal substrate and does not crack or craze when the panel is bent double.

EXAMPLE 2

A 100 milliliter resin kettle is charged with 26.82 grams (0.1 mole) 4-phenyl trimellitate anhydride, 5.40 grams (0.05 mole) m-phenylenediamine and 55.0 grams N-methylpyrrolidone (dried over molecular sieves). The resin kettle is equipped as in Example 1 and the reaction mixture is heated to reflux under nitrogen. The nitrogen is turned off at the start of reflux and distillate is collected, first at total take-off and then at partial take-off, for 30 minutes to raise the distillation head temperature to 203°. The reaction mixture is held at total reflux for an additional 15 minutes and the reaction mixture is then cooled to room temperature under nitrogen. The resulting product is a clear, amber, slightly viscous solution.

The solution is precipitated into deionized water in a laboratory disintegrator and the precipitate is filtered onto a Buchner funnel, washed with deionized water, and dried in a circulating air oven at 100° C. About 20 grams of an off-white, powdery solid is obtained having a melt point of 190–197° C. The produce (diimide-diester) is calculated to be $C_{36}H_{20}N_2O_8$ having 71.05% carbon; 3.31% hydrogen; 4.61% nitrogen and 21.03% oxygen. Analysis of the product shows: 70.19% carbon; 3.22% hydrogen; 4.78% nitrogen and 21.25% oxygen.

A polyamide-imide polymer can be prepared from the above diimide-diester by reacting the diimide-diester with 4,4'-oxydianiline in a molar ratio of about 1:1 in N-methylpyrrolidone solvent using the same reaction conditions and equipment as in Example 1. However, the total reflux time to obtain a high molecular weight polymer should be about 10 hours. The resulting polyamide-imide polymer should have properties similar to the polyamide-imide polymer of Example 1 and should be useful as an impregnant and a high temperature coating composition.

A polyimide-ester polymer can be prepared from the above diimide-diester by reacting the diimide-diester with hexamethylene glycol in a molar ratio of about 1:1 in a suitable high boiling solvent. Equipment and reaction conditions similar to Example 1 can be used to obtain this polymer. The resulting polyimide-ester polymer should be useful as an impregnant and as a coating composition.

What is claimed is:

1. A diimide-diester of the formula

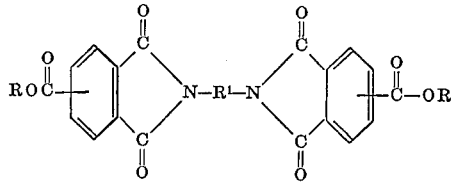

wherein R is phenyl and $R^1$ is selected from the group consisting of phenylene

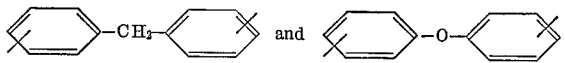

2. The diimide-diester of claim 1 in which $R^1$ is

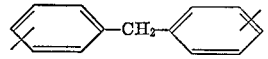

3. The diimide-diester of claim 1 in which $R^1$ is phenylene.

References Cited

UNITED STATES PATENTS 3,274,159   9/1966   Kluiber _____ 260—75

ALEX MAZEL, Primary Examiner

J. A. NARCAVAGE, Assistant Examiner

U.S. Cl. X.R.

117—128, 161; 252—76; 260—75, 78